US007773541B2

(12) United States Patent
Davison et al.

(10) Patent No.: US 7,773,541 B2
(45) Date of Patent: Aug. 10, 2010

(54) OBTAINING IDENTIFICATION INFORMATION FOR A NEIGHBORING NETWORK ELEMENT

(75) Inventors: Eric Stewart Davison, Peppard Common (GB); K. Gintaras Atkinson, San Francisco, CA (US); Scott Daniel Wilsey, Mead, WA (US); Darren William Oye, Greenacres, WA (US); Bo Wen, Spokane Valley, WA (US); Louis Reis, Spokane Valley, WA (US)

(73) Assignee: World Wide Packets, Inc., Spokane Valley, WA (US)

( * ) Notice: Subject to any disclaimer, the term of this patent is extended or adjusted under 35 U.S.C. 154(b) by 283 days.

(21) Appl. No.: 11/771,118

(22) Filed: Jun. 29, 2007

(65) Prior Publication Data

US 2009/0003333 A1  Jan. 1, 2009

(51) Int. Cl.
*H04L 12/28* (2006.01)
(52) U.S. Cl. ..................................... 370/254
(58) Field of Classification Search ........................ None
See application file for complete search history.

(56) References Cited

U.S. PATENT DOCUMENTS

| 5,758,083 | A * | 5/1998 | Singh et al. ............... 709/223 |
| 6,944,130 | B1 | 9/2005 | Chu et al. |
| 7,324,447 | B1 | 1/2008 | Morford |
| 7,447,233 | B2 | 11/2008 | Narad et al. |
| 2001/0054093 | A1 | 12/2001 | Iwatani |
| 2005/0138157 | A1 | 6/2005 | Jung et al. |
| 2006/0023751 | A1 * | 2/2006 | Wilson et al. ............... 370/474 |
| 2006/0120297 | A1 * | 6/2006 | Hamedi et al. ............. 370/252 |
| 2006/0285487 | A1 | 12/2006 | Yasuie et al. |
| 2007/0110072 | A1 | 5/2007 | Elias |
| 2007/0115967 | A1 | 5/2007 | Vandenberghe et al. ..... 370/389 |
| 2007/0201384 | A1 * | 8/2007 | Cunningham et al. ....... 370/254 |
| 2008/0219268 | A1 | 9/2008 | Dennison |
| 2009/0003336 | A1 | 1/2009 | Daines et al. |
| 2009/0003337 | A1 | 1/2009 | Daines et al. |

OTHER PUBLICATIONS

Cisco Systems, "LLDP-MED and Cisco Discovery Protocol", 2006, published by Cisco Systems, pp. 1-13.*
Enterasys, "Configured Neighbor Discovery", Oct. 15, 2008, pp. 1-14.*
U.S. Appl. No. 11/771,080, filed Jun. 29, 2007; Scott Daniel Wilsey et al.; 45 pp.
Cisco, Catalyst 3560 Switch Software Configuration Guide; Cisco IOS Release 12.2(37)SE, May 2007, Cisco Systems, pp. 16-1-16-18.

* cited by examiner

*Primary Examiner*—Chirag G Shah
*Assistant Examiner*—Otis L Thompson, Jr.
(74) *Attorney, Agent, or Firm*—Clements Bernard PLLC; Christopher L. Bernard; Tyler S. Brown

(57) ABSTRACT

If a selected packet switch connected to a neighboring packet switch makes first information identifying the neighboring packet switch available, element managers and processes retrieve the first information from the selected packet switch. The first information is derived by the selected packet switch from communication via a first protocol between the selected packet switch and the neighboring packet switch. If the first information is not available to the element manager and if the selected packet switch makes second information identifying the neighboring packet switch available to the element manager, the element managers and processes retrieve the second information from the selected packet switch. The second information is derived from communication via a second protocol between the selected packet switch and the neighboring packet switch and the first and second protocols are different protocols.

25 Claims, 7 Drawing Sheets

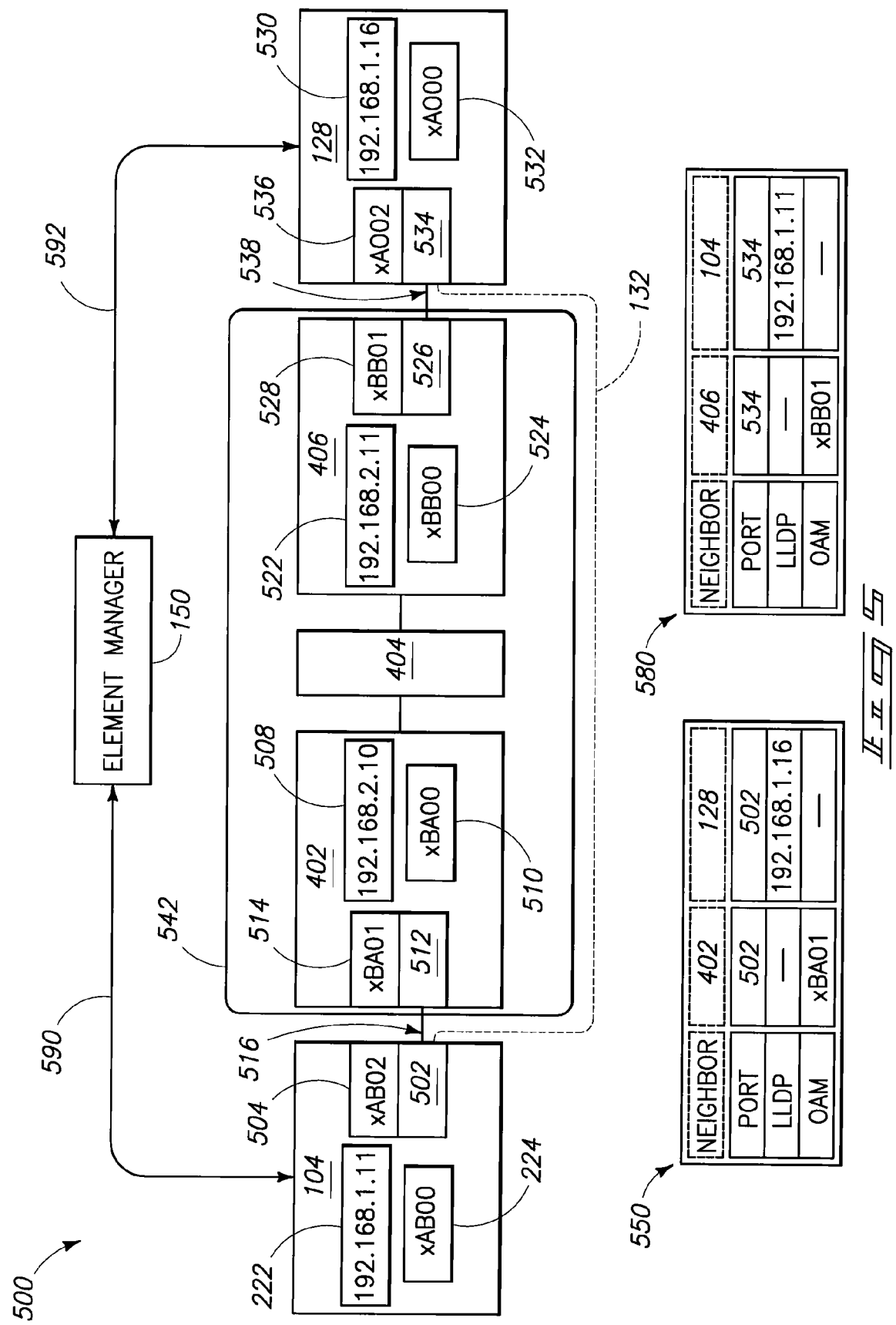

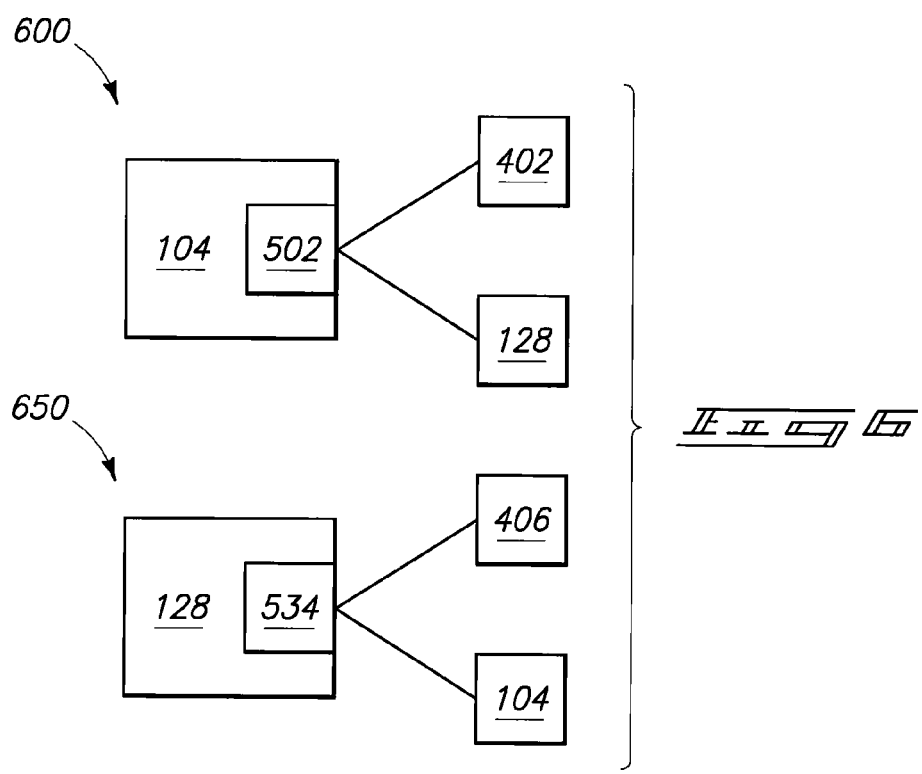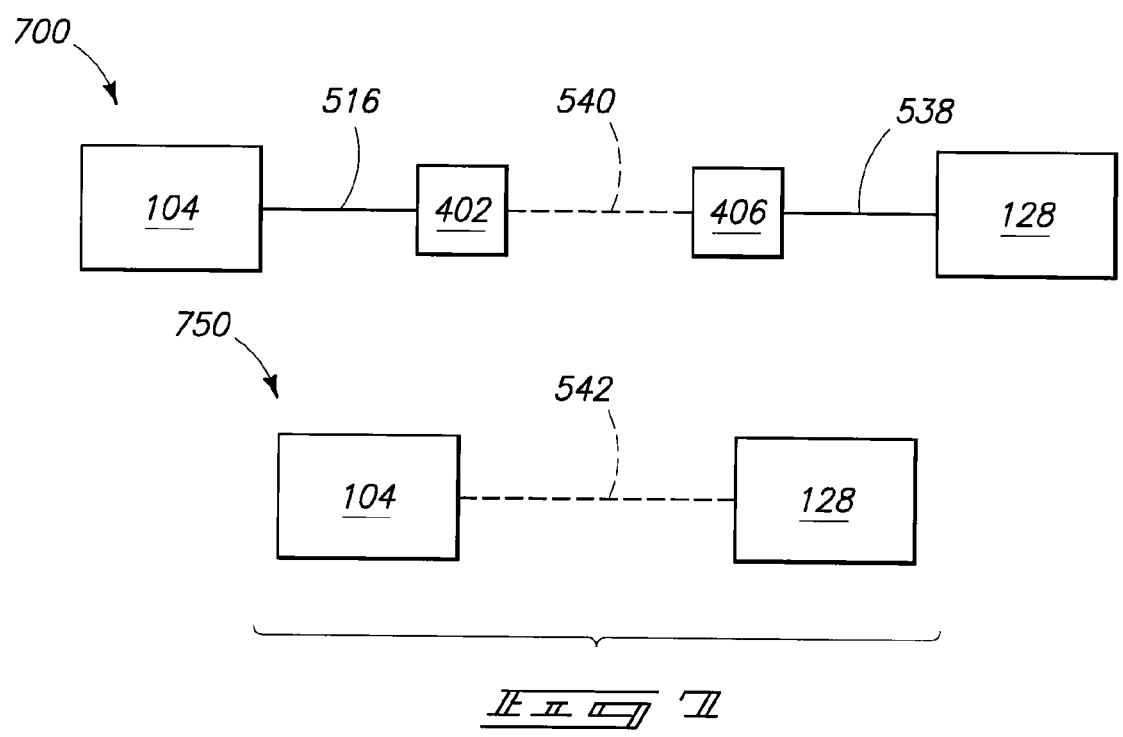

800
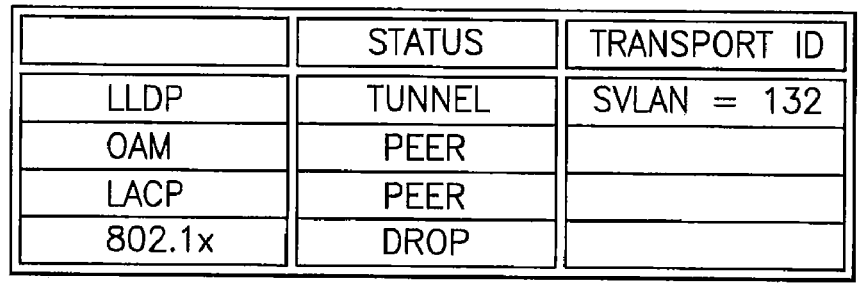
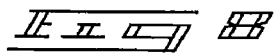
900
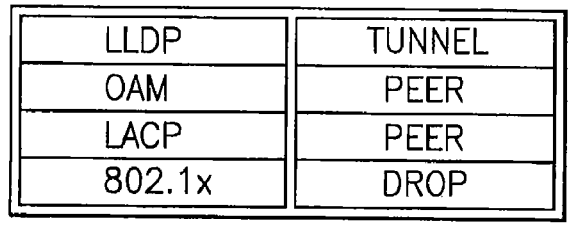
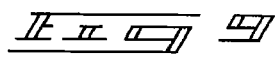
1000
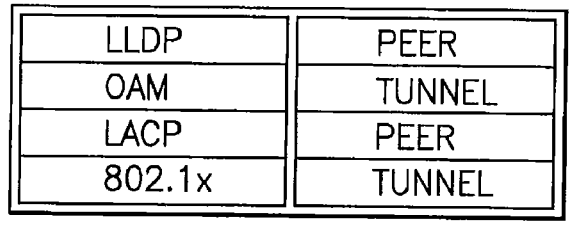

OBTAINING IDENTIFICATION INFORMATION FOR A NEIGHBORING NETWORK ELEMENT

RELATED APPLICATION DATA

This application is related to simultaneously filed U.S. patent application Ser. No. 11/771,080 entitled "Progressively Determining a Network Topology and Using Neighbor Information to Determine Network Topology" and naming Scott Daniel Wilsey, K. Gintaras Atkinson, Darren William Ove, Bo Wen, and Louis Reis as inventors; simultaneously filed U.S. patent application Ser. No. 11/771,620 entitled "Determining a Logical Neighbor of a Network Element" and naming Kevin Q Daines and Scott Daniel Wilsey as inventors; and simultaneously filed U.S. patent application Ser. No. 11/771,746 entitled "Determining the State of a Tunnel with respect to a Control Protocol" and naming Kevin Q Daines and Scott Daniel Wilsey as inventors.

TECHNICAL FIELD

The present invention, in various embodiments, relates to obtaining identification information for a neighboring network element.

BACKGROUND OF THE INVENTION

Networks of elements (e.g., packet switches, servers, routers, and the like) may be managed by an element manager. The element manager may perform various functions such as receiving alarms from the elements, upgrading software or firmware on the elements, and configuring the elements. In order to manage the elements of the network, the element manager may use addresses of the elements by which the element manager may communicate with the elements. In some cases, a network operator may manually provide the element manager with the addresses. In other cases, the element manager may ping a range of addresses in search of the elements.

For some management functions, the element manager may need connection information describing how the elements connect to each other in order to display a network topology. In some configurations, the network topology may represent physical connections between the elements. Typically, in such configurations, the network operator manually provides connection information describing physical connections between the elements to the element manager.

In some configurations of the elements, two of the elements may be logically connected by a tunnel but may each be physically connected to different intermediate elements that facilitate the tunnel. Typically, the element manager is unable to distinguish between the logical connections and the physical connections.

The tunnel may be configured to relay layer-two control packets conforming to some protocols and may be configured not to relay layer-two control packets conforming to other protocols. A desired tunnel configuration supplied by a network operator may specify which layer-two protocols are to be tunneled and which are not to be tunneled. In some networks, the element manager may be unable to verify whether the tunnel is relaying the layer-two control protocols indicated by the desired tunnel configuration.

BRIEF DESCRIPTION OF THE DRAWINGS

Preferred embodiments of the invention are described below with reference to the following accompanying drawings.

FIG. 5 illustrates a block diagram of a tunnel, a third chart containing neighbor information, and a fourth chart containing neighbor information.

FIG. 6 illustrates a port topology for a first element and a port topology for a second element.

FIG. 7 illustrates a first displayed topological model and a second displayed topological model.

FIG. 8 illustrates a first chart containing tunnel configuration information.

FIG. 9 illustrates a second chart containing tunnel configuration information.

FIG. 10 illustrates a chart containing a desired tunnel configuration.

DETAILED DESCRIPTION OF THE PREFERRED EMBODIMENTS

Figure 1:
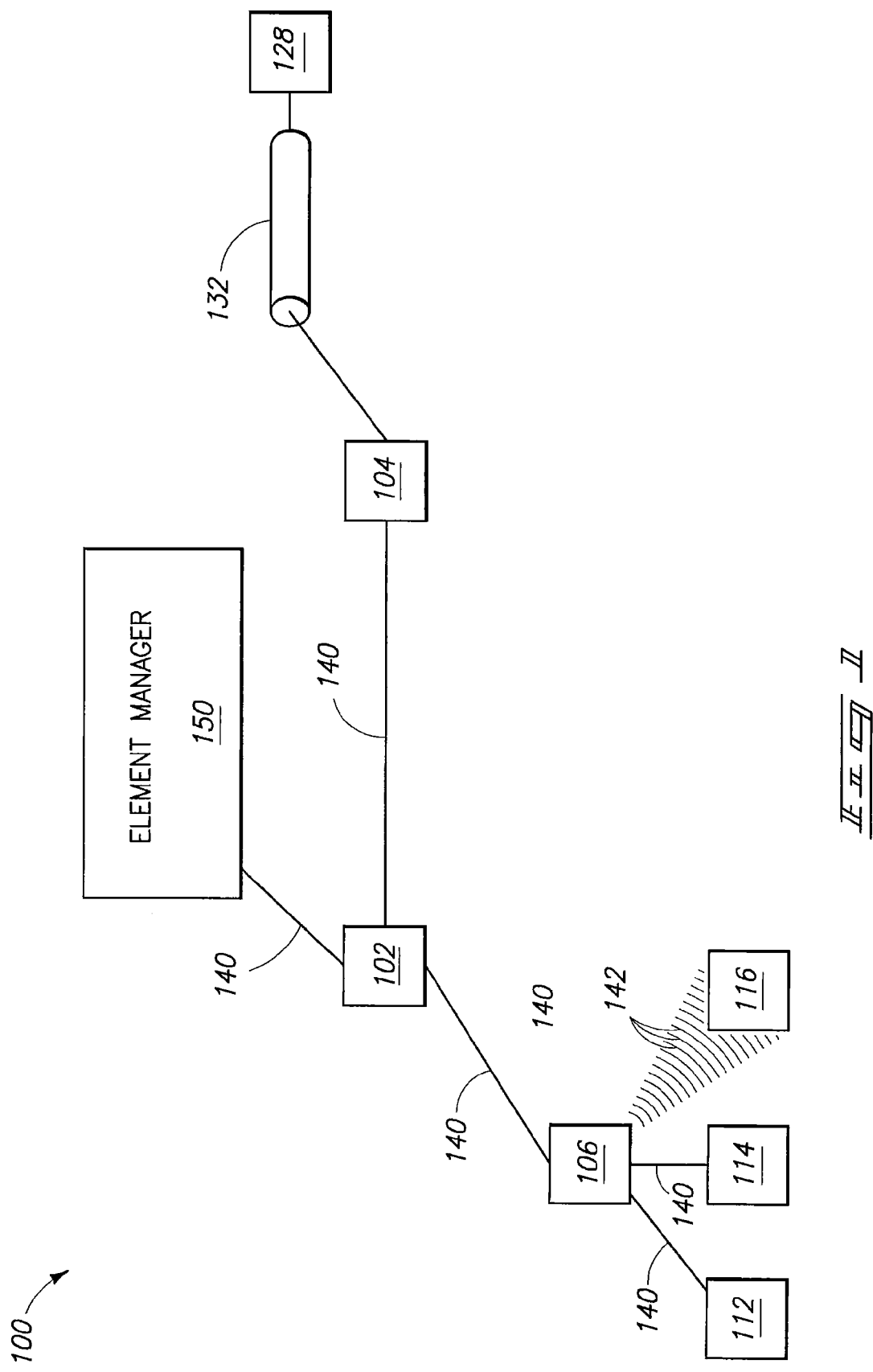
FIG. 1 illustrates a network of elements.

FIG. 1 illustrates a network 100 of elements 102, 104, 106, 112, 114, 116, and 128. The elements may be packet switches, computers, servers, routers, or other devices capable of being connected to a network. The elements of network 100 are interconnected by links 140 and 142. Each link directly connects two of the elements of network 100 together. Some of links 140 may be electrically conductive cables, some may be fiber optic cables, and some may be wireless links. Link 142 is depicted as a wireless link. As used herein, the term "wireless link" is considered a physical link.

An element manager 150 is connected to element 102 by one of links 140. Although element manager 150 is directly physically connected to element 102, links 140 and 142 provide element manager 150 with connectivity to the other elements of network 100. Element manager 150 may communicate with the elements of network 100 using one or more of a variety of techniques. For example, the communication may take place via Simple Network Management Protocol (SNMP) messages, eXtensible Markup Language (XML) messages, command line interface (CLI) commands, remote method invocations (RMI), or NETCONF messages.

In some configurations, element manager 150 may be implemented as software operating on one or more servers. The number of elements that element manager 150 is capable of managing may depend on the specifications of the server(s) on which the software is installed. For example, a low-end server may be able to manage a small number of elements, whereas a cluster of high-end servers may be able to manage a large number of devices.

Element manager 150 may perform various management functions with respect to the elements of network 100. For example, element manager 150 may discover connections between the elements of network 100, discover tunnels within network 100, and detect tunnel misconfigurations, as will be described in detail below. Element manager 150 may provide information about network 100 to a network operator.

Figure 4:
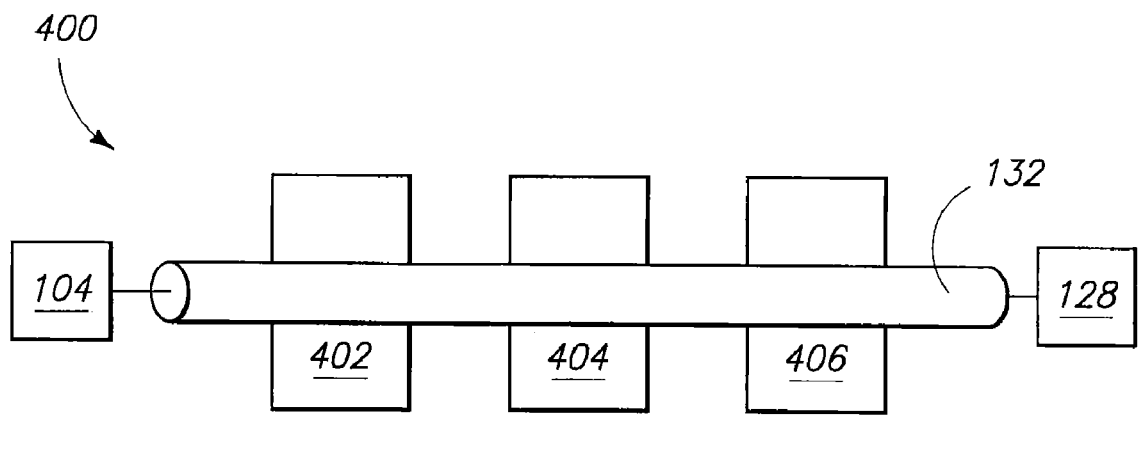
FIG. 4 illustrates a tunnel topology.

Although element 104 is indirectly physically connected to element 128, element 104 is directly logically connected to element 128 by a tunnel 132. Tunnel 132 may relay packets from element 104 to element 128. Tunnel 132 may additionally relay packets from element 128 to element 104. Tunnel 132 may be facilitated by intermediate elements which are illustrated in FIGS. 4-5 and described in detail below. Even though the intermediate elements facilitate tunnel 132, packets traveling through tunnel 132 may not exit tunnel 132 at the intermediate elements. Furthermore, packets sent from element 104 to tunnel 132 may all take the same path from element 104 to element 128.

Element manager 150 may determine a topology of the elements of network 100. The network topology may be stored as a model that describes the elements of network 100 and connections between the elements of network 100. Element manager 150 may implement the model in a number of ways. For example, the model may be a collection of objects and relationships between objects. The objects and relationships may be stored in a database. Alternatively, the model may be stored as a collection of variables, records, or other data structures. Element manager 150 may build the model by retrieving information from the elements of network 100 that describes how the elements are interconnected. Element manager 150 may retrieve the information in a number of different ways.

According to one aspect of the invention, an element manager operating method includes retrieving first information from a selected packet switch connected to a neighboring packet switch if the selected packet switch makes first information identifying the neighboring packet switch available to the element manager. If the first information is not available to the element manager and if the selected packet switch makes second information identifying the neighboring packet switch available to the element manager, the element manager retrieves the second information from the selected packet switch.

If the first information and the second information are not available to the element manager, the method may include retrieving third information from the selected packet switch if the selected packet switch makes the third information available to the element manager.

The selected packet switch derives the first information from communication between the selected packet switch and the neighboring packet switch via a first protocol. The first protocol may be a layer-two (data link layer of the open systems interconnection model) protocol. The selected packet switch derives the second information from communication between the selected packet switch and the neighboring packet switch via a second protocol. The second protocol may also be a layer-two protocol. The first and second protocols are different protocols and may be user selectable.

The selected packet switch may derive the third information from communication between the selected packet switch and the neighboring packet switch via a third protocol. In some cases, the first, second, and third protocols may be different protocols.

The first protocol may be one of Link Layer Discovery Protocol (LLDP); Institute of Electrical and Electronics Engineers (IEEE) 802.3ah Operations, Administration and Maintenance (OAM); IEEE 802.3ad Link Aggregation Control Protocol (LACP); Spanning Tree Protocol (STP); STP Uplink Fast; Rapid Spanning Tree Protocol (RSTP); Multiple Spanning Tree Protocol (MSTP); Cisco Discovery Protocol (CDP); Per VLAN Spanning Tree (PVST); IEEE 802.1x Port Based Network Access Control; Unidirectional Link Detection (UDLD); Port Aggregation Protocol (PAGP); or marker protocol. The second protocol may be a different one of LLDP, IEEE 802.3ah OAM, LACP, STP, STP Uplink Fast, RSTP, MSTP, CDP, PVST, IEEE 802.1x, UDLD, PAGP, or marker protocol.

The first information and the second information may be retrieved from a management interface of the selected packet switch via at least one of an SNMP message, an XML message, a response to a CLI command, a reply to an RMI, or a NETCONF message.

The first information identifying the neighboring packet switch may include an Internet Protocol (IP) address of a management interface of the neighboring packet switch. The second information identifying the neighboring packet switch may include a Medium Access Control (MAC) address associated with a chassis of the neighboring packet switch. Alternatively or additionally, the second information identifying the neighboring packet switch may include a MAC address associated with a port of the neighboring packet switch to which the selected packet switch is connected.

A port of the selected packet switch may be connected to a port of the neighboring packet switch by a single physical pathway such as an electrically conductive cable, a fiber-optic cable, or a wireless link.

The method may be repeated for neighboring packet switches connected to other ports of the selected packet switch.

Figure 2:
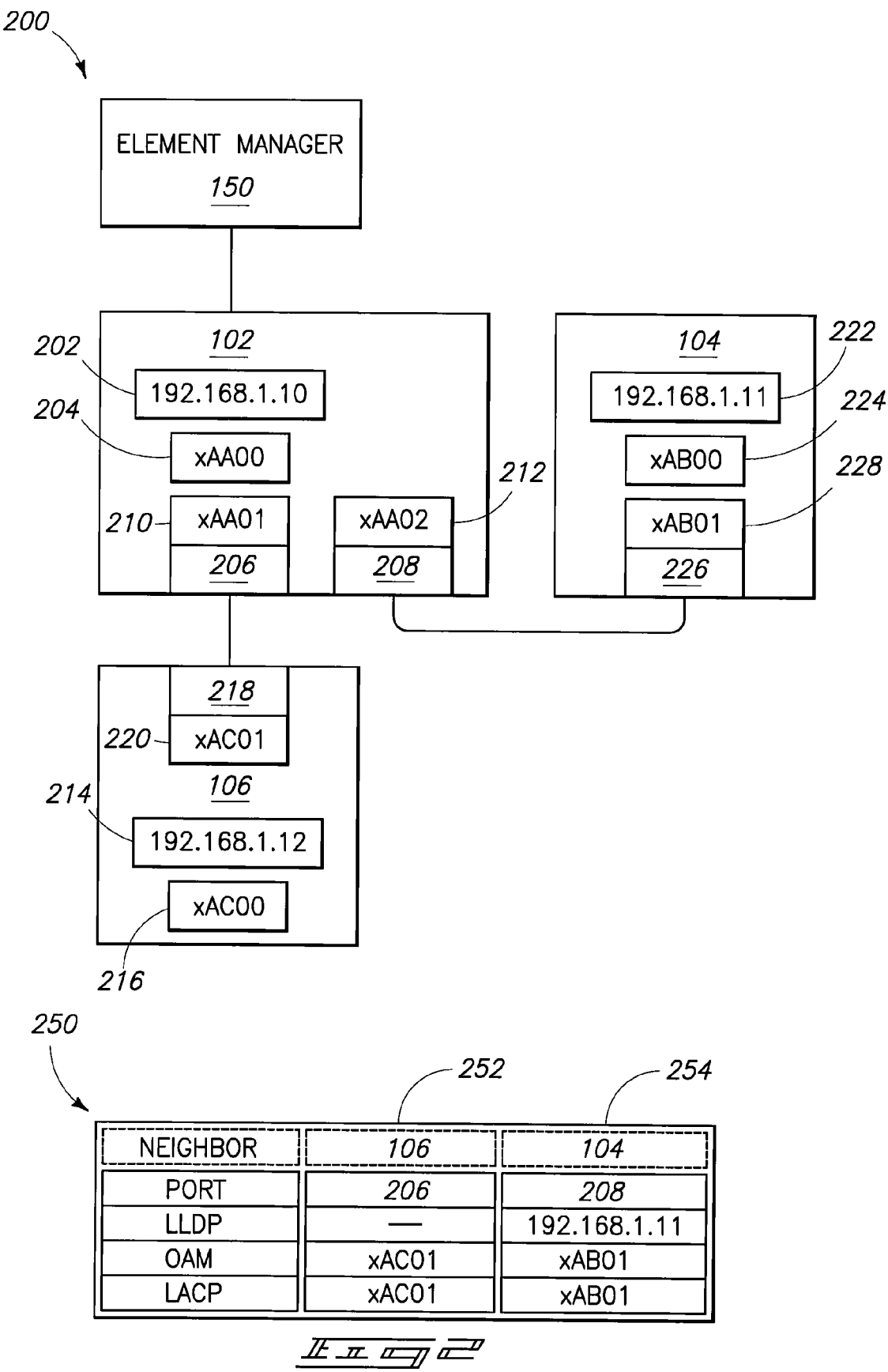
FIG. 2 illustrates a first element topology and a first chart containing neighbor information.

FIG. 2 illustrates an element topology 200 of element 102 of FIG. 1 including element 102 and elements directly connected to element 102, namely elements 104 and 106. In addition, element manager 150 is depicted as being directly physically connected to element 102. Element 102 includes an IP address 202 and a base MAC address 204. Although base MAC address 204 is depicted as having four hexadecimal digits, it is to be understood that base MAC address 204 and the other MAC addresses described herein may have more than four hexadecimal digits. MAC addresses having four hexadecimal digits are used herein for simplicity.

Element 102 also includes two ports 206 and 208. Port 206 is assigned port MAC address 210 and port 208 is assigned port MAC address 212. Port MAC addresses 210 and 212 may be related to base MAC address 204. For example, port MAC addresses 210 and 212 and base MAC address 204 may have several hexadecimal digits in common. In some cases, base MAC address 204 may be derived from port MAC address 210 or port MAC address 212. In other words, knowing port MAC address 210, one may determine base MAC address 204.

Element 104 includes an IP address 222 and a base MAC address 224. Furthermore, element 104 includes a port 226, which is assigned a port MAC address 228. Likewise, element 106 includes an IP address 214, a base MAC address 216, and a port 218. Port 218 is assigned a port MAC address 220.

Port 208 of element 102 is directly physically connected to port 226 of element 104 since there are no intermediate elements between ports 208 and 226. Similarly, port 206 of element 102 is directly physically connected to port 218 of element 106. In contrast, as illustrated in FIG. 1, element 106 is indirectly physically connected to element 104 by two physical pathways, one connecting elements 106 and 102, and the other connecting elements 102 and 104.

Element 102 may receive information identifying directly connected neighboring elements 104 and 106 via layer-two control protocol packets. Upon receiving the layer-two control protocol packets, element 102 may extract identification information from the packets. As was discussed above, the layer-two control protocols may conform to a number of different layer-two control protocols.

Chart 250 illustrates information that element 102 may extract from layer-two control packets received from neighboring elements 104 and 106. By way of example, column 252 illustrates that element 102 has received an OAM packet from element 106 on port 206 and has extracted port MAC address 220 (which identifies port 218 of element 106) from the OAM packet. Similarly, column 252 illustrates that element 102 has received an LACP packet from element 106 and has extracted port MAC address 220 from the LACP packet.

Column 254 of chart 250 illustrates that element 102 has received an LLDP packet from element 104 on port 208 containing IP address 222. In addition, element 102 has received an OAM packet from element 104 on port 208 containing port MAC address 228 and an LACP packet from element 104 on port 208 containing port MAC address 228. IP address 222 and port MAC address 228 may uniquely identify element 104.

Element 102 may make the neighbor identification information extracted from these layer-two control packets available to element manager 150 in a number of different ways. For example, element 102 may make the information available in one or more management information bases (MIBs). Element manager 150 may retrieve the neighbor identification information of chart 250 from element 102 via an SNMP message, an XML message, a NETCONF message, a CLI message, an RMI, or other method.

In some cases, element manager 150 may derive IP address 214 from port MAC address 220. In doing so, element manager 150 may first derive base MAC address 216 from port MAC address 220 and then use base MAC address 216 to derive IP address 214 by performing a look-up of base MAC address 216 in a directory containing mapping between base MAC address 216 and IP address 214 such as a Dynamic Host Configuration Protocol (DHCP) server directory.

Element manager 150 may retrieve all or portions of the neighbor identification information of chart 250 or other neighbor identification information not depicted in chart 250 from element 102 in a number of different ways.

In one configuration, element manager 150 may prefer a particular type of neighbor identification information. For example, in retrieving from element 102 neighbor identification information identifying element 104, element manager 150 may first attempt to retrieve neighbor identification information derived from LLDP communication between elements 102 and 104. Neighbor identification information derived from LLDP communication may be preferable since it may provide IP address 222. Since neighbor identification information derived from LLDP is available from element 102, element manager 150 might not retrieve further neighbor identification information identifying element 104 (e.g., port MAC address 228) from element 102.

In contrast, element 102 might not provide neighbor identification information derived from LLDP communication for element 106 because element 106 might not support LLDP. In this case, element manager 150 may determine that neighbor identification information derived from LLDP communication identifying element 106 is not available from element 102 and in response may retrieve neighbor identification information derived from OAM communication between elements 102 and 106. Neighbor identification information derived from OAM communication might not include IP address 214 because OAM packets sent by element 106 to element 102 might not include IP address 214. However, OAM packets sent by element 106 to element 102 may include port MAC address 220. Element manager 150 may retrieve port MAC address 220 from element 102 and then derive IP address 214 from port MAC address 220. Element manager 150 may subsequently use IP address 214 to communicate with element 106.

If an element does not support either LLDP or OAM, element manager 150 may retrieve neighbor identification information derived from layer-two control packets of a third protocol, for example, neighbor information derived from LACP packets. Accordingly, element manager 150 may retrieve neighbor information according to a prioritized order of layer-two control protocols. Of course, additional layer-two control protocols could be added to the prioritized order.

The prioritized order of layer-two control protocols may be specified by a network operator. For example, the network operator may specify a prioritized order of LLDP, OAM, LACP, and RSTP. In some cases, the prioritized order may vary from element to element. For example, element manager 150 may use a prioritized order of LLDP, OAM, LACP, and RSTP for some types of elements (e.g., elements that support LLDP) and a prioritized order of OAM, RSTP, and LACP for other types of elements (e.g., elements that do not support LLDP).

As an alternative to using a prioritized order, element manager 150 may retrieve all or portions of the neighbor identification information of chart 250 or other neighbor identification information not depicted in chart 250 from element 102 in other ways.

According to another aspect of the invention, an element manager operating method includes receiving neighbor information from a selected network element. The neighbor information describes two or more neighboring network elements connected to the selected network element. In some configurations, the selected network element and the neighboring network elements may be Ethernet packet switches.

The element manager determines identification information for a first of the neighboring network elements using a first subset of the neighbor information derived from communication via a first protocol between the selected network element and the first of the neighboring network elements.

The element manager also determines identification information for a second of the neighboring network elements using a second subset of the neighbor information derived from communication via a second protocol between the selected network element and the second of the neighboring network elements. The first protocol and the second protocol are different protocols.

The first of the neighboring network elements may be connected to a first port of the selected network element by a first single physical pathway and the second of the neighboring network elements may be connected to a second port of the selected network element by a second physical pathway. The first port and the second port may be different ports and the first pathway and the second pathway may be different pathways.

Alternatively, the first of the neighboring network elements may be connected to a first port of the selected network element by a single first physical pathway and the second of the neighboring network elements may also be connected to the first port of the selected network element via the first physical pathway. One example of such a configuration is discussed in detail below in relation to FIGS. 5-8.

In some configurations, element manager 150 may retrieve neighbor identification information identifying a single neighbor and being derived from packets received by element 102 conforming to different layer-two protocols. For example, element manager 150 may retrieve neighbor identification information identifying element 104 that is derived from LLDP communication from element 102 and may in addition retrieve neighbor identification information identifying element 104 that is derived from OAM and LACP communication from element 102.

Similarly, element manager 150 may retrieve neighbor identification information identifying element 106 that is derived from OAM and LACP communication from element 102. After retrieving the neighbor identification information, element manager 150 may sort through the neighbor identification information, using the neighbor identification it needs, and discarding the rest of the neighbor identification information.

This approach to retrieving neighbor identification information may be advantageous in situations where it may be preferable for element manager 150 to retrieve neighbor identification information derived from multiple layer-two control protocols for multiple ports of an element all at once, even if some of the neighbor identification information is redundant or useless, rather than element manager 150 making a series of individual retrievals of preferred portions of the neighbor identification information.

According to another aspect of the invention, a network element operating method includes receiving neighbor information from two or more neighboring network elements connected to the network element. The neighbor information for at least one of the neighboring network elements is received via one or more packets conforming to a first protocol and the neighbor information for at least one other of the neighboring network elements is received via one or more packets conforming to a different second protocol. The first protocol may be a layer-two control protocol and the second protocol may be a different layer-two control protocol.

The network element determines identification information uniquely identifying each of the two or more neighboring network elements that is derived from the received neighbor information. The network element receives a request for the identification information and, in response to the received request, transmits the identification information. The identification information uniquely identifying the individual network element may be one or both of an IP address of the individual network element or a MAC address of the individual network element.

Transmitting may include transmitting the identification information via at least one of an SNMP message, an XML message, a response to a CLI command, a reply to an RMI, or a NETCONF message.

In other configurations, element manager 150 may use yet another approach to retrieving neighbor identification. According to this approach, element 102 may receive layer-two control packets from elements 104 and 106 containing neighbor identification information. Element 102 (rather than element manager 150) may sift through the neighbor identification information on a per port basis to come up with a single identifier for element 104 and a single identifier for element 106. For example, element 102 may select IP address 222 as the identifier for element 104 and may select port MAC address 220 as the identifier for element 106. Element 102 may use the prioritized order described above in sorting through the information.

Once element 102 has selected a single identifier for element 104 and a single identifier for element 106, element manager 150 may retrieve the two single identifiers from element 102.

In some cases, element 102 may be capable of deriving an IP address from a port MAC address as was described above. Accordingly, element 102 may determine IP address 214 from port MAC address 220. This approach may be advantageous since deriving IP addresses from port MAC addresses is distributed to elements rather than being performed by element manager 150.

Figure 3:
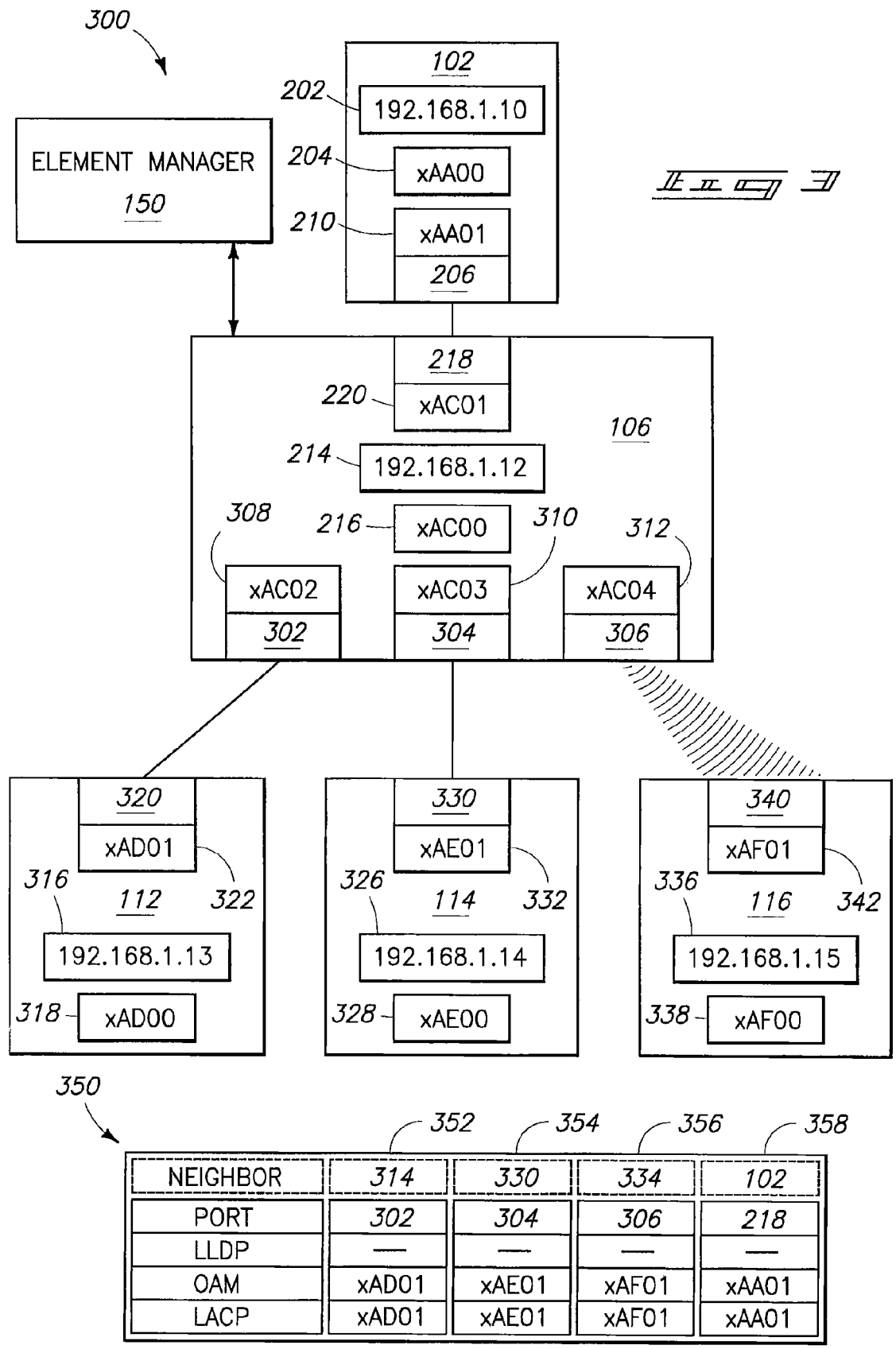
FIG. 3 illustrates a second element topology and a second chart containing neighbor information.

FIG. 3 illustrates an element topology 300 of element 106 of FIG. 1 including element 106 and elements directly connected to element 106, namely elements 102, 112, 114, and 116. In addition, element manager 150 is depicted as being indirectly connected to element 106. Element 106 includes IP address 214, base MAC address 216, port 218, and port MAC address 220 as described above. In addition, element 106 includes ports 302, 304, and 306. A port MAC address 308 is assigned to port 302, a port MAC address 310 is assigned to port 304, and a port MAC address 312 is assigned to port 306.

Element 102 includes IP address 202, base MAC address 204, port 206, and port MAC address 210 of FIG. 1. Port 206 of element 102 is connected to port 218 of element 106 as was illustrated above in FIG. 2.

Element 112 includes an IP address 316, a base MAC address 318, a port 320, and a port MAC address 322 assigned to port 320. Element 114 includes an IP address 326, a base MAC address 328, a port 330, and a port MAC address 332 assigned to port 330. Element 116 includes an IP address 336, a base MAC address 338, a port 340, and a port MAC address 342 assigned to port 340.

Port 320 of element 112 is connected to port 302 of element 106 by a single physical pathway as was described above, for example an electrically conductive cable or fiber optic cable. Likewise, port 330 of element 114 is connected by a single physical pathway to port 304 of element 106. Port 340 of element 116 is also connected to port 306 of element 106 by a single physical pathway, in this case a wireless link.

Element manager 150 may communicate with element 106 to retrieve neighbor identification information identifying neighboring elements 102, 112, 114, and 116. Such neighbor identification information is illustrated in chart 350. Column 352 of chart 350 indicates that element 106 has received an OAM packet on port 302 from element 112 containing port MAC address 322. Element 106 has also received an LACP packet from element 112 on port 302 containing port MAC address 322.

Column 354 indicates that element 106 has received an OAM packet containing port MAC address 332 on port 304 and an LACP packet containing port MAC address 332 on port 304. Column 356 indicates that element 106 has received an OAM packet containing port MAC address 342 from element 116 on port 306 and an LACP packet containing port MAC address 342 from element 116 on port 306. Column 358 of chart 350 indicates that element 106 has received an OAM packet from element 102 on port 218 containing port MAC address 210 and an LACP packet from element 102 on port 218 containing port MAC address 210.

In some configurations, elements 102 and 106 may be packet switches. Element 102 may aggregate more traffic than element 106. Accordingly, element 102 may be a first type of high capacity, sophisticated packet switch supporting a large number of protocols while element 106 may be a second type of less sophisticated, less expensive packet switch having less capacity than element 102 and supporting fewer protocols. Consequently, element 102 may support LLDP while element 106 might not support LLDP.

Element manager 150 may be able to determine which type element 106 is, and may request information differently from element 106 based on its type than from element 102. For example, element manager 150 might use a different prioritized order when retrieving neighbor identification information from element 106 than when retrieving neighbor identification information from element 102.

As illustrated by chart 350, element 106 might not acquire neighbor identification information derived from LLDP communication. Element manager 150 may recognize that element 106 is of a type that does not support LLDP and may therefore use an appropriate prioritized order that does not include LLDP but rather includes OAM and LACP. Using a prioritized order appropriate to an element type may increase element manager 150's efficiency in retrieving neighbor identification information.

As was discussed above in relation to FIG. 1, element 104 is directly connected to element 128 by tunnel 132. FIG. 4 illustrates a topology 400 of tunnel 132. Topology 400 includes elements 104 and 128 and tunnel 132. Topology 400 also includes three intermediate elements 402, 404, and 406. Intermediate elements 402, 404, and 406 facilitate tunnel 132. Element 104 is directly logically connected to element 128 by tunnel 132. However, element 104 is indirectly physically connected to element 128.

Instead, element 104 is directly physically connected to element 402, which is directly physically connected to element 404. Element 404 is also directly physically connected to element 406 which is directly physically connected to element 128. Intermediate elements 402, 404, and 406 relay packets associated with tunnel 132 from element 104 to element 128 and/or from element 128 to element 104 without removing the packets from tunnel 132.

Tunnel 132 may relay control packets and non-control packets. In particular, tunnel 132 may relay some layer-two control packets, but not all layer-two control packets. For example, tunnel 132 may be configured to relay layer-two control packets of a first layer-two control protocol, but not layer-two control packets of a second layer-two control protocol. To accomplish this, element 402 may be configured to process layer-two control packets received from element 104 in one of at least three different ways.

Element 402 may tunnel layer-two control packets of a first protocol. These layer-two control packets are relayed by tunnel 132 to element 128. In response to receiving layer-two control packets of the first protocol, element 128 may send a layer-two control packet of the first protocol to element 104. In this manner, element 104 and element 128 may communicate with each via layer-two control packets of the first protocol.

Element 402 may "peer" layer-two control packets of a second protocol by receiving the layer-two control packets of the second protocol from element 104 and processing the layer-two control packets of the second protocol rather than forwarding the layer-two control packets of the second protocol on to element 128. Processing the layer-two control packets of the second protocol may involve sending a layer-two control packet of the second protocol to element 104 in response to receiving a layer-two control packet of the second protocol. In this manner, elements 104 and 402 communicate with each other via layer-two control packets of the second protocol. For example, if the second protocol is LLDP, element 104 may send an LLDP packet containing identification information describing element 104 to element 402. In response to receiving the LLDP packet, element 402 may send an LLDP packet containing identification information describing element 402 to element 104.

Element 402 may alternatively treat layer-two control packets in a third manner. Element 402 may be configured to drop layer-two control packets of a third protocol. If element 104 sends layer-two control packets of the third protocol to element 402, rather than forwarding the layer-two control packets of the third protocol to element 128 via tunnel 132 or responding to the layer-two control packets of the third protocol, element 402 may drop the layer-two control packets of the third protocol.

Element 402 may be configured to either tunnel, peer, or drop each of a set of layer-two control protocols received from element 104. For example, element 402 may be configured to peer LLDP packets, tunnel OAM packets, and drop 802.1x packets. Element 402 may have different configurations for each port of element 402. In other words, element 402 may be configured to peer LLDP packets received on one port and to tunnel LLDP packets received on a different port.

The discussion above describes behavior of element 402 upon receiving control packets from element 104. Element 406 may be configured to have similar behavior with respect to control packets received from element 128.

Note that element 104 is directly connected to both elements 402 and 128 since element 104 is directly physically connected to element 402 and is directly logically connected to element 128 by tunnel 132. Accordingly, element 104 is directly connected to two neighboring elements, elements 402 and 128, on a single port of element 104.

FIG. 5 illustrates a block diagram 500 of topology 400. Element 104 includes IP address 222 as was described above in relation to FIG. 2. In addition, element 104 includes a base MAC address 224, a port 502, and a port MAC address 504 assigned to port 502. Element 402 includes an IP address 508, a base MAC address 510, a port 512, and a port MAC address 514 assigned to port 512. Port 502 of element 104 is connected by a single communication channel 516 to port 512 of element 402.

Element 402 is connected to element 404, which is connected to element 406. Element 406 includes an IP address 522, a base MAC address 524, a port 526, and a port MAC address 528 assigned to port 526. In some configurations, elements 104 and 128 may be operated by a first network operator and may be managed by element manager 150, while elements 402, 404, and 406 may be operated by a different second network operator and consequently might not be managed by element manager 150. A delimiter 542 surrounds elements 402, 404, and 406, which, in some configurations, may be operated by the second network operator.

Element 128 includes an IP address 530, a base MAC address 532, a port 534, and a port MAC address 536 assigned to port 534. Port 534 of element 128 is connected to port 526 of element 406 by a single communication channel 538.

Tunnel 132 is also illustrated in FIG. 5 as connecting port 502 of element 104 to port 534 of element 128. Note that tunnel 132 is shown as a dashed line indicating that elements 104 and 128 are directly logically connected. The dashed line representing tunnel 132 is not a direct physical connection, however, since packets of tunnel 132 are physically relayed by elements 402, 404, and 406 between element 104 and element 128. Element manager 150 is depicted as being indirectly connected to element 104 at 590 and indirectly connected to element 128 at 592.

Element 104 may receive neighbor identification information from elements 402 and 128 via layer-two control packets received from elements 402 and 128. Chart 550 illustrates a portion of the neighbor identification information that element 104 may extract from layer-two control packets received from elements 402 and 128. For example, chart 550 illustrates that element 104 has extracted IP address 530 of element 128 from an LLDP packet sent from element 128 to element 104 via tunnel 132.

Chart 550 also illustrates that element 104 has received an OAM packet from element 402, and has extracted port MAC address 514 from the OAM packet. Element manager 150 may retrieve all or a portion of the neighbor identification information of chart 550 from element 104. Element manager 150 may also retrieve additional neighbor identification information from element 104 not depicted in chart 550.

Element manager 150 may subsequently derive an IP address associated with port MAC address 514, using, for example, the method described above, and determine that the derived IP address is not the same as IP address 530, which element manager 150 also retrieved from element 104. Consequently, element manager 150 may determine that port 502 of element 104 is directly connected to two different elements, and may further conclude that element 104 is directly connected to one of the elements physically and to the other element logically by a tunnel.

Element 128 may acquire neighbor identification information from elements 104 and 406. The identification information may be derived from layer-two control packets received at element 128 from elements 104 and 406. Chart 580 illustrates the neighbor identification information. Note that element 128 may receive additional neighbor identification information not depicted in chart 580. For simplicity, only portions of the neighbor identification information are illustrated in chart 580.

Element manager 150 may retrieve neighbor identification information, such as the identification information of chart 580, from element 128, and may determine that port 534 of element 128 is directly physically connected to one neighbor and directly logically connected to a different neighboring element after deriving an IP address associated with port MAC address 528, which was retrieved by element manager 150.

FIG. 6 illustrates a port topology 600 of port 502 of element 104 and a port topology 650 of port 534 of element 128. Port topology 600 illustrates a situation in which port 502 of element 104 is directly connected to both element 402 and element 128. Upon discovering that port 502 has two neighboring elements, element manager 150 may conclude that one neighboring element is a logical neighbor and that the other neighboring element is a physical neighbor. Similarly, port topology 650 illustrates a situation in which port 534 of element 128 is directly connected to both element 406 and element 104.

Element manager 150 may use a variety of techniques to determine which of the two neighboring elements directly connected to a single port is the logical neighbor and which is the physical neighbor.

According to another aspect of the invention, an element manager operating method includes receiving, from a selected network element, first neighbor information describing a first neighboring network element directly connected to the selected network element and second neighbor information describing a different second neighboring network element directly connected to the selected network element. The first neighboring network element and the second neighboring network element may both be connected to a same port of the selected network element.

Based at least in part on the first neighbor information and the second neighbor information, the element manager determines that the first neighboring network element is a logical neighbor that is connected by a tunnel to the selected network element and is coupled to the selected network element via one or more intermediate packet switches.

The element manager may also, based at least in part on the first neighbor information and the second neighbor information, determine that the second neighboring network element is a physical neighbor directly physically connected to the selected network element by a single physical pathway. In some configurations, the element manager may determine that the second neighboring network element is a physical neighbor by deriving an IP address of the second neighboring network element from the second neighbor information and determining that the IP address is not within a range of IP addresses managed by the element manager.

In one configuration, the element manager may determine that the first neighboring network element is a logical neighbor by retrieving, from the first neighboring network element, third neighbor information describing a third neighboring network element directly connected to the first neighboring network element and fourth neighbor information describing a different fourth neighboring network element directly connected to the first neighboring network element.

Based on the third neighbor information and the fourth neighbor information, the element manager may determine that the third neighboring network element is the selected network element, that the fourth neighboring network element is a physical neighbor of the first neighboring network element, and that the second neighboring network element is a physical neighbor of the selected network element. The tunnel is facilitated by the fourth neighboring network element.

The first neighbor information may be derived from communication via a first layer-two control protocol between the selected network element and the first neighboring network element and the second neighbor information may be derived from communication via a second layer-two control protocol between the selected network element and the second neighboring network element. The first and second control protocols may be different protocols.

Furthermore, the third neighbor information may be derived from communication via the first layer-two control protocol between the third neighboring network element and the first neighboring network element and the fourth neighbor information may be derived from communication via the second layer-two control protocol between the first neighboring network element and the fourth neighboring network element.

In another configuration, the element manager may determine that the first neighboring network element is a logical neighbor by retrieving, from the second neighboring network element, a configuration indicating that the second neighboring network element is configured to respond to control packets received by the second neighboring network element that conform to the second layer-two protocol, configured to modify packets received that conform to the first layer-two protocol by adding a tunnel identifier to the received packets, and configured to forward the modified packets via the tunnel, the configuration being retrieved via a management interface of the second neighboring network element.

The tunnel identifier may include at least one of at least one Virtual Local Area Network (VLAN) identifier, at least one Multiprotocol Label Switching (MPLS) label, a Provider Bridging (PB) identifier, a Provider Backbone Bridging (PBB) identifier, a Provider Backbone Transport (PBT) identifier, Provider Backbone Bridging Traffic Engineering (PBB-TE) identifier, or a Virtual Private LAN Services (VPLS) identifier.

The element manager may also display a network diagram comprising symbols representing the selected network element, the first neighboring network element, the second neighboring network element, the fourth neighboring network element, a first link connecting the selected network element and the second neighboring network element, a second link connecting the first neighboring network element and the fourth neighboring network element, and a third link connecting the second network element and the fourth network element. The symbol representing the third link may be visually distinguishable from the symbols representing the first and second links.

Alternatively, the element manager may display a network diagram comprising symbols representing the selected network element, the first neighboring network element, and a link connecting the first neighboring network element and the selected network element. The symbol representing the link may be visually distinguishable from any symbols of the network diagram representing physical links.

Returning now to FIG. 6, element manager 150 may use neighbor identification information retrieved from elements 104 and 128 to determine which of the two neighbors of port 502 of element 104 is a logical neighbor and which is a physical neighbor and to determine which of the two neighbors of port 534 of element 128 is a logical neighbor and which is a physical neighbor.

According to another aspect of the invention, an element manager operating method includes retrieving first information from a first packet switch, the first information identifying packet switches from which the first packet switch has received layer-two control packets and retrieving second information from a second packet switch, the second information identifying packet switches from which the second packet switch has received layer-two control packets.

Based at least in part on the first information and the second information, the element manager determines, without accessing any management interface of a third packet switch, that the first packet switch is directly physically connected to the third packet switch by a single physical pathway and that the first packet switch is directly logically connected to the second packet switch by a tunnel facilitated by the single physical pathway.

The element manager may determine that the address of the third packet switch matches an address of a physical neighbor of the first packet switch and that the address of the second packet switch matches an address of a logical neighbor of the first packet switch. A port of the first packet switch may have a single physical neighbor and a single logical neighbor. The second packet switch may be one of the devices from which the first packet switch received the layer-two control packets.

Retrieving the first information may include retrieving the first information via a management interface of the first packet switch and retrieving the second information may include retrieving the second information via a management interface of the second packet switch. The first information may include an address of the second packet switch and an address of the third packet switch and the second information may include an address of the first packet switch.

According to one approach, element manager 150 may notice that element 104 and element 128 both have two neighbors on a single port. Element manager 150 may compare the neighbors of element 104 with the neighbors of element 128 to determine if element 104 is connected to element 128. In doing so, element manager 150 may recognize that since element 104 has element 128 as a neighbor, and element 128 has element 104 as a neighbor, element 104 is logically connected to element 128. Consequently, since element 128 is a logical neighbor of element 104, element 402 is a physical neighbor of element 104. Similarly, element 406 is a physical neighbor of element 128.

Based on this determination, element manager 150 may display a physical topology of tunnel 132 to a network operator. FIG. 7 illustrates two ways in which the physical topology of the tunnel may be displayed. In topology 700, element manager 150 displays element 104 connected by a first link 516 to element 402, element 402 connected to element 406 via a second link 540, and element 406 connected to element 128 by a third link 538.

Note that links 516 and 538 are both displayed as being solid lines. This is significant because links 516 and 538 are physical links that connect element 104 to its physical neighbor 402, and element 128 to its physical neighbor 406. Link 540 is shown as a dashed line, indicative of the fact that element 402 is not necessarily physically connected to element 406, but that element 402 relays tunnel 132 from element 402 to element 406.

Of course, other designations may be used besides solid and dashed lines as long as links 516 and 538 have a common format and link 540 has a different format so that a network operator may detect that links 516 and 538 are physical links and link 540 is indicative of a tunnel.

FIG. 7 also illustrates a second topology 750. In topology 750, element 104 is depicted as being connected to element 128 via link 542, depicted as a dashed line. Link 542 is symbolic of a logical link (i.e., a tunnel) between elements 104 and 128 and indicates that element 104 is not necessarily physically connected to element 128, but that intermediate elements, such as elements 402, 404, and 406, may be present which connect element 104 to element 128. Link 542 does not necessarily have to be a dashed line, but may be displayed differently than physical links also displayed alongside topology 750 so that a network operator may readily identify link 542 as a logical link associated with a tunnel, rather than a physical link.

Returning now to FIG. 5, element manager 150 may take a different approach to determining whether element 402 is a logical neighbor or a physical neighbor of element 104, and whether element 128 is a logical neighbor or a physical neighbor of element 104.

Note that in the prior approach, element manager 150 retrieved neighbor identification information from elements 104 and 128, but did not communicate with elements 402, 404, or 406. Such communication is not necessary since element manager 150 is able to determine whether the neighbors are logical or physical based on the information of charts 550 and 580.

According to the second approach, element manager 150 may retrieve configuration information from element 402 describing the configuration of port 512 with respect to layer-two control protocols. This approach may be feasible when element manager 150 manages element 402. In some cases, elements 104, 402, 404, 406, and 128 may be operated by the same network operator. In this case, element manager 150 may have access to element 402. In other cases, elements 402, 404, and 406 may be operated by a different network operator that allows element manger 150 access to element 402.

FIG. 8 illustrates a chart 800 depicting configuration information for port 512 of element 402. Chart 800 indicates that LLDP packets received on port 512 are to be tunneled. In other words, upon receiving LLDP packets on port 512, element 402 will forward the LLDP packets to element 128 via tunnel 132 and consequently via elements 404 and 406. Prior to forwarding the LLDP packets, element 402 may add a transport identifier to the LLDP packets, such as a Service VLAN (SVLAN) as depicted in chart 800. The transport identifier may indicate to subsequent elements (e.g., elements 404 and 406) that the LLDP packets are to be relayed in tunnel 132 rather than being peered or dropped. Alternatively, the transport identifier may prevent the subsequent elements from detecting that the LLDP packets are layer-two control packets.

Chart 800 also indicates that OAM packets received on port 512 are to be peered. In other words, upon receiving an OAM packet on port 512, element 402 is configured to respond to the OAM packet by sending an OAM packet to element 104, if appropriate according to the protocol. Depending upon the contents of the particular OAM packet received, element 402 may not necessarily need to respond to the particular OAM packet. However, if a response is appropriate according to the OAM protocol, element 402 may respond to the received OAM packet by sending an OAM packet to port 502 of element 104. As shown in FIG. 8, chart 800 also indicates that LACP packets received on port 512 are to be peered and that 802.1x packets received on port 512 are to be dropped.

After retrieving the contents of chart 800 from element 402, element manager 150 may determine that LLDP packets are configured to be tunneled via tunnel 132 to element 128. Knowing that LLDP packets are being tunneled at element 402, based on chart 800, element manager 150 may conclude that the IP address associated with LLDP in chart 550 is IP address 530, the IP address of element 128. Consequently, element manager 150 may conclude that element 128 is a logical neighbor of element 104.

Element manager 150 may similarly retrieve tunnel configuration information for port 526 of element 406 from element 406 and, using the tunnel configuration information for port 526, determine that element 104 is a logical neighbor of element 128 and element 406 is a physical neighbor of element 128.

In some network configurations, element manager 150 may take yet a different approach to determining whether element 402 is a logical neighbor or a physical neighbor of element 104, and whether element 128 is a logical neighbor or a physical neighbor of element 104. If elements 402, 404, and 406 are operated by a different network operator than elements 104 and 128, IP addresses 508 and 522 (and the IP address of element 404) may be associated with a different IP subnet than IP addresses 222 and 530. Upon retrieving the neighbor identification information of charts 550 and 580 and upon deriving IP addresses from the neighbor identification information, element manager 150 may recognize IP address 530 as being from the same subnet as IP address 222 and conclude that element 128 is a logical neighbor of element 104. Additionally or alternatively, element manager 150 may recognize IP address 508 as being from a different subnet than IP address 222 and conclude that element 402 is a physical neighbor of element 104.

According to another aspect of the invention, a network element operating method includes receiving first neighbor information describing a first neighboring network element directly connected to the network element and second neighbor information describing a different second neighboring network element directly connected to the network element.

Based at least in part on the first neighbor information and the second neighbor information, the network element determines that the first neighboring network element is a logical neighbor that is connected by a tunnel to the network element and is coupled to the network element via one or more intermediate packet switches.

The network element may determine that the first neighboring network element is a logical neighbor by retrieving, from the first neighboring network element, third neighbor information describing a third neighboring network element directly connected to the first neighboring network element and fourth neighbor information describing a different fourth neighboring network element directly connected to the first neighboring network element. Based on the third neighbor information and the fourth neighbor information, the network element may determine that the third neighboring network element is the network element, that the fourth neighboring network element is a physical neighbor of the first neighboring network, and that the second neighboring network element is a physical neighbor of the network element. The tunnel is facilitated by the fourth neighboring network element.

Yet another approach may be taken to determine whether element 402 is a logical or physical neighbor of element 104, and whether element 128 is a logical or physical neighbor of element 104. According to this approach, element 104 (rather than element manager 150) retrieves the neighbor identification information contained in chart 580 from element 128. Element 104 then follows one or more of the approaches described above to determine that element 128 is a logical neighbor and that element 402 is a physical neighbor. Similarly, element 128 may retrieve the neighbor identification information of chart 550 from element 104, and conclude that element 406 is a physical neighbor and element 104 is a logical neighbor. This approach may advantageously distribute the burden of determining logical and physical neighbors to the elements instead of placing the burden on the element manager.

According to another aspect of the invention, an element manager operating method includes receiving, from a selected network element, first neighbor information describing a first neighboring network element directly connected to the selected network element and second neighbor information describing a different second neighboring network element directly connected to the selected network element. The first neighbor information is associated with a layer-two control protocol. The second neighbor information might not be associated with the layer-two control protocol but may be associated with a different layer-two control protocol.

Based at least in part on the first neighbor information and the second neighbor information, the element manager determines that the first neighboring network element is a logical neighbor that is connected by a tunnel to the selected network element and is coupled to the selected network element via one or more intermediate packet switches and that the tunnel is configured to relay layer-two packets conforming to the protocol. In some cases, the element manager may make this determination without accessing any management interface of any of the intermediate packet switches.

The element manager determines that, according to a desired tunnel configuration for the tunnel, the intermediate packet switches should not be configured to relay layer-two control packets conforming to the protocol via the tunnel. The desired tunnel configuration may be known by the element manager but might not be known by or implemented on the intermediate packet switches. In response, the element manager may alert a network operator that the intermediate packet switches should not be configured to relay the layer-two control packets conforming to the protocol via the tunnel.

FIG. 9 illustrates a chart 900 depicting the configuration of element 402 with respect to a set of layer-two control protocols. Chart 900 indicates that element 402 is configured to tunnel LLDP packets received on port 512 via tunnel 132, peer OAM and LACP packets received on port 512, and drop 802.1x packets received on port 512.

Chart 900 differs from chart 800 in that chart 800 depicts the configuration of port 512 of element 402 as retrieved from element 402 while chart 900 depicts the configuration of port 512 of element 402 as deduced by an element other than element 402. Acquiring the information of chart 800 may involve merely requesting the information from element 402. In contrast, deducing the information of chart 900 may involve analyzing neighbor identification information from elements 104 and 128. Accordingly, acquiring the information of chart 800 may require less time and processing power than acquiring the information of chart 900.

However, acquiring the information of chart 800 involves having access to element 402. As was discussed above, in some configurations, element manager 150 might not have access to element 402 because element 402 may be operated by a different network operator than the network operator associated with element manager 150.

In some configurations, element manager 150 may deduce the configuration information depicted in chart 900. As described above, element manager 150 may determine that element 128 is a logical neighbor of element 104 and that element 402 is a physical neighbor of element 104 based on charts 550 and 580. Element manager 150 may further determine (using the contents of charts 550 and 580) that since element 128 has IP address 530 and IP address 530 was received by element 104 via an LLDP packet, LLDP packets are being tunneled between elements 104 and 128. Thus, element manager 150 may conclude that element 402 is configured to tunnel LLDP packets received on port 512.

Furthermore, element manager 150 may determine, based on the contents of chart 550, that since OAM packets received by element 104 include port MAC address 514 (the port MAC address assigned to port 512 of element 402), OAM packets transmitted from port 502 are being peered by element 402. Thus, element manager 150 may conclude that element 402 is configured to peer OAM packets received from port 502.

In general, to determine whether element 402 is configured to tunnel, peer, or drop packets conforming to a particular layer-two protocol received from port 502, element manager 150 may retrieve information about the particular layer-two protocol from element 104. The retrieved information may be derived from a packet conforming to the layer-two protocol that element 104 has received from element 402. The retrieved information may include a neighbor identifier identifying an element that sent the packet conforming to the layer-two protocol to element 104. The neighbor identifier may be an IP address, port MAC address, base MAC address, or other identifier. If the neighbor identifier is not an IP address, element manager 150 may derive an IP address associated with the neighbor identifier using, for example, the method described above.

If the IP address matches the IP address of the physical neighbor (element 402), then element manager 150 may conclude that element 402 is configured to peer packets conforming to the layer-two protocol. If the IP address of the LACP packet matches the IP address of the logical neighbor (element 128), then element manager 150 may conclude that element 402 is configured to tunnel packets conforming to the layer-two protocol. By way of example, element manager 150 may use this technique to determine that port 512 of element 402 is configured to peer LACP packets.

Element manager 150 may determine that port 512 of element 402 is configured to drop packets conforming to some layer-two control protocols. For example, element manager 150 may attempt to retrieve 802.1x information from element 104. However, element 104 might not have received any 802.1x packets on port 502 and therefore might not have any neighbor identification information associated with 802.1x packets.

In some cases, element manager 150 may inspect a configuration of element 104 to determine whether element 104 is configured to transmit 802.1x packets on port 502. If element 104 is configured to transmit 802.1x packets on port 502, yet no 802.1x packets have been received on port 502 in response to the transmitted 802.1x packets, element manager 150 may conclude that 802.1x packets are being dropped by element 402.

According to another aspect of the invention, a packet switch operating method includes receiving a layer-two control packet conforming to a layer-two control protocol on a port of the packet switch from a neighboring packet switch directly connected to the port and based at least in part on the received control packet, determining that the neighboring packet switch is connected to the packet switch by a tunnel.

The packet switch also receives a request from an element manager for information describing a state of the layer-two control protocol on the port and in response to the request, informs the element manager that the tunnel is configured to relay control packets conforming to the tunnel.

The element manager may be configured to compare the information indicating that the layer-two control protocol is being tunneled with a desired tunnel configuration and alert a network operator if, according to the desired tunnel configuration, the layer-two control protocol should not be tunneled.

In some configurations, the packet switch may determine that the neighboring packet switch is a packet switch known to relay layer-two control packets conforming to a different layer-two control protocol via the tunnel based on an address of the received control packet.

The packet switch may send a layer-two control packet conforming to another layer-two control protocol on the port. Based on a lack of response to the layer-two control packet conforming to the other layer-two control protocol, the packet switch may determine that another neighboring packet switch directly connected to the port is configured to discard layer-two control packets received from the packet switch that conform to the other layer-two control protocol.

In some configurations, element 104 (rather than element manager 150) may deduce the configuration information depicted in chart 900. To do so, element 104 may use the same steps described above with respect to element manager 150 deducing the configuration information depicted in chart 900. Once element 104 has deduced the configuration information of chart 900, element 104 may provide the configuration information to element manager 150 upon request.

In addition to the configuration information of chart 900, element manager 150 may have access to a desired tunnel configuration for port 512 of element 402. FIG. 10 illustrates a desired tunnel configuration 1000 for port 512 of element 402 indicating that LLDP packets should be peered, OAM packets should be tunneled, LACP packets should be peered, and 802.1x packets should be tunneled. Desired tunnel configuration 1000 describes a particular configuration of port 512 of element 402 that a network operator desires to be implemented.

However, even though desired tunnel configuration 1000 may be present in element manager 150, element manager 150 might not be able to configure element 402 according to desired tunnel configuration 1000. In some situations, element manager 150 may be operated by a first network operator and element 402 may be operated by a different second network operator. In these situations, element manager 150 might not be able to send desired tunnel configuration 1000 to element 402 because the second network operator might not allow element manager 150 to access element 402.

Instead, the first network operator may provide desired tunnel configuration 1000 to the second network operator with the understanding that the second network operator will configure element 402 according to desired tunnel configuration 1000. However, the second network operator responsible for element 402 might unintentionally (or intentionally)

fail to configure element 402 according to desired tunnel configuration 1000. The first network operator might not be aware of the second network operator's failure to configure element 402.

According to another aspect of the invention, an element manager operating method includes retrieving information from a first packet switch, the information being derived from layer-two control packets relayed from a second packet switch to the first packet switch via a tunnel, the layer-two control packets conforming to a layer-two control protocol.

The element manager determines, based at least in part on the retrieved information, that the tunnel is configured to relay layer-two control packets conforming to the layer-two control protocol despite a desired tunnel configuration specifying that the tunnel should not be configured to relay layer-two control packets conforming to the layer-two control protocol.

The element manager may alert a network operator that the tunnel is configured to relay layer-two control packets conforming to the layer-two control protocol despite the desired tunnel configuration.

In some cases, the element manager may retrieve additional information from the first packet switch, the additional information being derived from additional layer-two control packets relayed from a third packet switch to the first packet switch, the additional layer-two control packets conforming to another layer-two protocol and the third packet switch being connected to the first packet switch by a single physical pathway.

Based on the retrieved additional information, the element manager may determine that the tunnel is not configured to relay layer-two control packets conforming to the other layer-two control protocol despite a desired tunnel configuration specifying that the tunnel should be configured to relay layer-two control packets conforming to the other layer-two control protocol. The tunnel may be facilitated by the third packet switch.

In response, the element manager may alert a network operator that the tunnel is not configured to relay layer-two control packets conforming to the other layer-two control protocol despite the desired tunnel configuration specifying that the tunnel should be configured to relay layer-two control packets conforming to the other layer-two control protocol.

The element manager may also determine, based on the additional layer-two control packets relayed from the third packet switch to the first packet switch, that the third packet switch is configured to process and respond to layer-two control packets conforming to the other layer-two control protocol sent from the first packet switch to the third packet switch.

The desired tunnel configuration may be known by the element manager, but might not be known by or implemented on the intermediate switches.

Element manager 150 may be configured to detect a situation in which element 402 is not configured according to desired tunnel configuration 1000 by comparing the contents of chart 900 (deduced either by element manager 150 or element 104 as described above) with desired tunnel configuration 1000 and identifying discrepancies. For example, chart 900 indicates that element 402 is configured to tunnel LLDP packets received on port 512 whereas desired tunnel configuration 1000 indicates that LLDP packets should be peered.

In response to discovering this discrepancy, element manager 150 may notify the first network operator of the discrepancy. For example, element manager 150 may create a visual alarm within a graphical user interface; may send an email, short message, page, or text message; or may utilize any other mechanism intended to alert the first network operator of the discrepancy. In some configurations, element manager 150 may additionally notify the second network operator of the discrepancy.

Element manager 150 may similarly discover other discrepancies. For example, according to chart 900, OAM packets are being peered despite desired tunnel configuration 1000 indicating that they should be tunneled and 802.1x packets are being dropped despite desired tunnel configuration 1000 indicating that they should be tunneled.

Finding discrepancies between a tunnel configuration as implemented (chart 900) and desired tunnel configuration 1000 may help to prevent unwanted network behavior. For example, if RSTP packets are peered when they are meant to be dropped, they may have an unintended effect of altering the operation of element 402 and other elements connected to element 402.

According to another aspect of the invention, an article of manufacture includes media including programming configured to cause processing circuitry (e.g., a microprocessor) to perform processing that executes one or more of the methods described above. The programming may be embodied in a computer program product(s) or article(s) of manufacture, which can contain, store, or maintain programming, data, and/or digital information for use by or in connection with an instruction execution system including processing circuitry. In some cases, the programming may be referred to as software, hardware, or firmware.

For example, the media may be electronic, magnetic, optical, electromagnetic, infrared, or semiconductor media. Some more specific examples of articles of manufacture including media with programming include, but are not limited to, a portable magnetic computer diskette (such as a floppy diskette), zip disk, hard drive, random access memory, read only memory, flash memory, cache memory, and/or other configurations capable of storing programming, data, or other digital information.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

The invention claimed is:

1. An element manager operating method comprising:
if a selected packet switch connected to a neighboring packet switch makes first information identifying the neighboring packet switch available to the element manager, then retrieving, using the element manager, the first information from the selected packet switch, the first information being derived by the selected packet switch from communication via a first protocol between the selected packet switch and the neighboring packet switch;
if the first information is not available to the element manager and if the selected packet switch makes second information identifying the neighboring packet switch available to the element manager, then retrieving, using the element manager, the second information from the selected packet switch, the second information being derived from communication via a second protocol between the selected packet switch and the neighboring packet switch, the first and second protocols being different protocols;

if another selected packet switch connected to another neighboring packet switch makes third information identifying the other neighboring packet switch available to the element manager, then retrieving, using the element manager, the third information from the other selected packet switch, the third information being derived by the other selected packet switch from communication via a third protocol between the other selected packet switch and the other neighboring packet switch;

if the third information is not available to the element manager and if the other selected packet switch makes fourth information identifying the other neighboring packet switch available to the element manager, then retrieving, the element manager, the fourth information from the other selected packet switch, the fourth information being derived from communication via a fourth protocol between the other selected packet switch and the other neighboring packet switch, the third and fourth protocols being different protocols; and wherein the selected packet switch is a different type of packet switch than the other selected packet switch and the third protocol is the same as the second protocol.

2. The method of claim 1 wherein a port of the selected packet switch is connected to a port of the neighboring packet switch by a single physical pathway, the single physical pathway comprising an electrically conductive cable, a fiber-optic cable, or a wireless link.

3. The method of claim 1 wherein the first protocol is a layer-two (data link layer) control protocol and the second protocol is a different layer-two control protocol.

4. The method of claim 1 wherein the retrieving the first information and the retrieving the second information comprise retrieving from a management interface of the selected packet switch via at least one of a Simple Network Management Protocol (SNMP) message, an eXtensible Markup Language (XML) message, a response to a command line interface (CLI) command, a reply to a remote method invocation (RMI), or a NETCONF message.

5. The method of claim 1 wherein the first information identifying the neighboring packet switch comprises an Internet Protocol (IP) address of a management interface of the neighboring packet switch.

6. The method of claim 1 wherein the second information identifying the neighboring packet switch comprises a Medium Access Control (MAC) address associated with a chassis of the neighboring packet switch.

7. The method of claim 1 wherein the second information identifying the neighboring packet switch comprises a MAC address associated with a port of the neighboring packet switch, the selected packet switch being connected to the neighboring packet switch via the port.

8. The method of claim 1 wherein the selected packet switch is connected to the neighboring packet switch via a port of the selected packet switch and further comprising repeating the method of claim 1 for neighboring packet switches connected to other ports of the selected packet switch.

9. The method of claim 1 wherein the first protocol and the second protocol are user selectable.

10. The method of claim 1 wherein the first protocol comprises one of Link Layer Discovery Protocol (LLDP); Institute of Electrical and Electronics Engineers (IEEE) 802.3ah Operations, Administration and Maintenance (OAM); IEEE 802.3ad Link Aggregation Control Protocol (LACP); Spanning Tree Protocol (STP); STP Uplink Fast; Rapid Spanning Tree Protocol (RSTP); Multiple Spanning Tree Protocol (MSTP); Cisco Discovery Protocol (CDP); Per VLAN Spanning Tree (PVST); IEEE 802.1x Port Based Network Access Control; Unidirectional Link Detection (UDLD); Port Aggregation Protocol (PAGP); or marker protocol and the second protocol comprises a different one of LLDP, IEEE 802.3ah OAM, LACP, STP, STP Uplink Fast, RSTP, MSTP, CDP, PVST, IEEE 802.1x, UDLD, PAGP, or marker protocol.

11. The method of claim 1 further comprising if the first information and the second information are not available to the element manager and if the selected packet switch makes fifth information identifying the neighboring packet switch available to the element manager, retrieving the fifth information from the selected packet switch, the fifth information being derived from communication via a fifth protocol between the selected packet switch and the neighboring packet switch, the first, second, and fifth protocols being different protocols.

12. An article of manufacture comprising non-transitory media comprising programming configured to cause processing circuitry to perform the method of claim 1.

13. An element manager operating method comprising:
receiving, using the element manager, neighbor information from a selected network element, the neighbor information describing two or more neighboring network elements connected to the selected network element;

determining, using the element manager, identification information for a first of the neighboring network elements using a first subset of the neighbor information derived from communication via a first protocol between the selected network element and the first of the neighboring network elements; and determining, using the element manager, identification information for a second of the neighboring network elements using a second subset of the neighbor information derived from communication via a second protocol between the selected network element and the second of the neighboring network elements, the first protocol and the second protocol being different protocols and the second subset of the neighbor information comprising a port MAC address of the second of the neighboring network elements; and deriving, using the element manager, a base MAC address of the second of the neighboring network elements from the port MAC address and deriving an IP address of the second of the neighboring network elements from the base MAC address.

14. The method of claim 13 wherein the selected network element and the neighboring network elements are Ethernet packet switches.

15. The method of claim 13 wherein the first of the neighboring network elements is connected to a first port of the selected network element by a first single physical pathway and the second of the neighboring network elements is connected to a second port of the selected network element by a second single physical pathway, the first port and the second port being different ports and the first pathway and the second pathway being different pathways.

16. The method of claim 13 wherein the first of the neighboring network elements is connected to a first port of the selected network element by a single first physical pathway and the second of the neighboring network elements is connected to the first port of the selected network element via the first physical pathway.

17. The method of claim 13 wherein the first protocol comprises one of LLDP, IEEE 802.3ah OAM, LACP, STP, STP Uplink Fast, RSTP, MSTP, CDP, PVST, IEEE 802.1x, UDLD, PAGP, or marker protocol and the second protocol comprises a different one of LLDP, IEEE 802.3ah OAM, LACP, STP, STP Uplink Fast, RSTP, MSTP, CDP, PVST, IEEE 802.1x, UDLD, PAGP, or marker protocol.

18. The method of claim 13 wherein the first subset of the neighbor information comprises an IP address of a management interface of the first of the neighboring network elements.

19. An article of manufacture comprising non-transitory media comprising programming configured to cause processing circuitry to perform the method of claim 13.

20. The method of claim 13 wherein the deriving of the IP address of the second of the neighboring network elements from the base MAC address comprises deriving using a DHCP server.

21. A packet switch operating method comprising:
receiving, using a packet switch, neighbor information from two or more neighboring network elements connected to the packet switch, the neighbor information for at least one of the neighboring network elements being received via one or more packets conforming to a first protocol and the neighbor information for at least one other of the neighboring network elements being received via one or more packets conforming to a different second protocol;
determining, using the packet switch, identification information uniquely identifying each of the two or more neighboring network elements, the packet switch deriving the identification information from the received neighbor information;
receiving, using the packet switch, a request for the identification information; and
in response to the received request, transmitting, using the packet switch, the identification information; and
wherein the neighbor information comprises a port MAC address of one of the neighboring network elements; and
the deriving of the identification information comprises deriving, using the packet switch, a base MAC address of the one of the neighboring network elements from the port MAC address and deriving an IP address of the one of the neighboring network elements from the base MAC address.

22. The method of claim 21 wherein the first protocol is a layer-two control protocol and the second protocol is a different layer-two control protocol.

23. The method of claim 21 wherein the identification information uniquely identifying the individual network element is one or more of an IP address of the individual network element or a MAC address of the individual network element.

24. An article of manufacture comprising non-transitory media comprising programming configured to cause processing circuitry to perform the method of claim 21.

25. The method of claim 21 further wherein the neighbor information for the at least one of the neighboring network elements is received from the at least one of the neighboring network elements via the one or more packets conforming to the first protocol and from the at least one of the neighboring network elements via additional packets conforming to a third protocol that is different from the first and second protocols, the one or more packets conforming to the first protocol being different from the additional packets conforming to the third protocol.

* * * * *